(12) United States Patent  (10) Patent No.: US 7,991,921 B2
Fischer  (45) Date of Patent: Aug. 2, 2011

(54) SYSTEM AND METHOD FOR REDUCING POWER CONSUMPTION OF MEMORY IN AN I/O CONTROLLER

(75) Inventor: Michael A. Fischer, San Antonio, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 470 days.

(21) Appl. No.: 12/046,324

(22) Filed: Mar. 11, 2008

(65) Prior Publication Data
US 2009/0234989 A1 Sep. 17, 2009

(51) Int. Cl.
*G06F 3/00* (2006.01)
*G06F 13/00* (2006.01)

(52) U.S. Cl. ............... 710/8; 710/2; 710/5; 710/15

(58) Field of Classification Search .............. None
See application file for complete search history.

(56) References Cited

U.S. PATENT DOCUMENTS

| | | | |
|---|---|---|---|
| 6,647,502 B1 | 11/2003 | Ohmori | |
| 7,134,028 B2 | 11/2006 | Bose et al. | |
| 7,663,961 B1 * | 2/2010 | Rowlands et al. | 365/227 |
| 2002/0133677 A1 * | 9/2002 | Choi | 711/152 |
| 2003/0206553 A1 * | 11/2003 | Surcouf et al. | 370/419 |
| 2004/0143769 A1 | 7/2004 | Deng et al. | |
| 2009/0027989 A1 * | 1/2009 | Michalak et al. | 365/222 |

OTHER PUBLICATIONS

Le Cai, Energy Management Using Buffer Memory for Streaming Data, Feb. 2005, ieeexplore.org, vol. 24 [online, accessed on Mar. 25, 2011] URL: http://ieeexplore.ieee.org/stamp/stamp.jsp?tp=&arnumber=1386373&userType=inst.*
Flautner, Krisztian et al. "Drowsy Caches: Simple Techniques for Reducing Leakage Power." Proceedings of the 29th annual International Symposium on Computer Architecture. IEEE 2002 pp. 148-157.

* cited by examiner

*Primary Examiner* — Tariq Hafiz
*Assistant Examiner* — Scott Sun
(74) *Attorney, Agent, or Firm* — Gary R. Stanford

(57) ABSTRACT

A memory system for an I/O controller which includes a memory with multiple memory blocks, a supply voltage control circuit providing power to each memory block, and control logic. Each memory block retains stored information with reduced power consumption when receiving a reduced voltage level. The control logic allocates buffers in the memory and controls the supply voltage control circuit to provide the full voltage level to at least one memory block of at least one allocated buffer and to provide the reduced voltage level to remaining memory blocks. Each memory block includes one or more buffers. In various embodiments the control logic fully powers each memory block of a buffer or less than all of the memory blocks. A linked buffer structure may be used to reduce the memory blocks of an allocated buffer receiving full power, such as only one memory block in the buffer.

22 Claims, 5 Drawing Sheets

SYSTEM AND METHOD FOR REDUCING POWER CONSUMPTION OF MEMORY IN AN I/O CONTROLLER

BACKGROUND OF THE INVENTION

1. Field of the Invention

The present invention relates in general to reducing static power consumption of memory of an electronic device, and more specifically to reducing power consumption of active memory in an input/output (I/O) controller.

2. Description of the Related Art

An embedded memory constitutes a significant portion of the transistor budget in an input/output (I/O) controller or I/O controller functional unit a system on chip (SoC) device. The embedded memory is in one example configured as static random access memory (SRAM), which is often implemented with six transistor SRAM cells or the like. As feature sizes scale below 100 nanometers (nm), increasing leakage currents make static power consumption a significant concern, especially for integrated circuits (ICs) intended for battery-operated portable or handheld electronic devices. Existing techniques for reducing memory leakage currents concern reducing power consumption during sleep periods (when I/O activity cannot be underway). In conventional configurations, the entire memory is powered up and active in order to be available to perform memory operations with minimal latency thereby consuming a significant amount of power.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
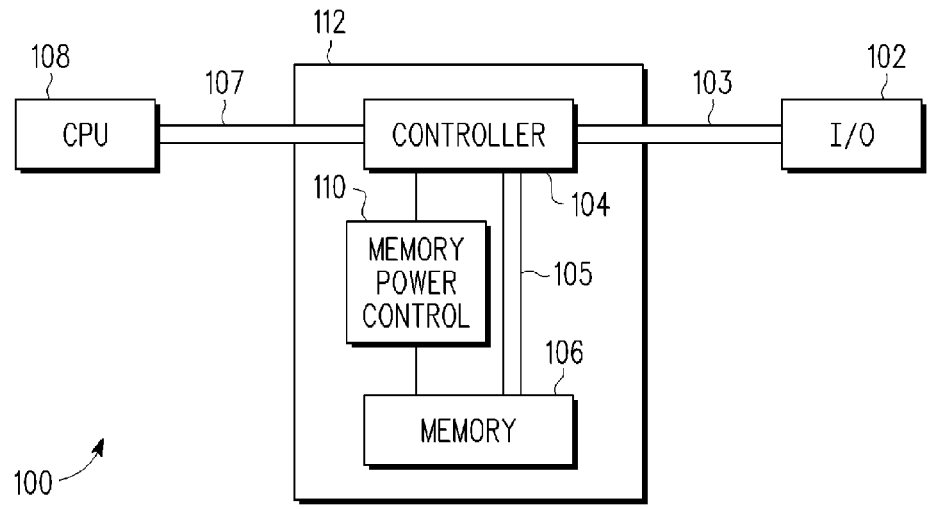
FIG. 1 is a simplified block diagram of an input/output (I/O) control system which incorporates a system and method for reducing power consumption of active memory according to an exemplary embodiment.

FIG. 1 is a simplified block diagram of an input/output (I/O) control system 100 which incorporates a system and method for reducing power consumption of active memory according to an exemplary embodiment. The I/O control system 100 includes an I/O device 102, a controller 104, a memory 106 and a processor system 108 coupled together with corresponding interfaces including an I/O interface 103, a memory interface 105 and a processor interface 107. The I/O control system 100 further includes a memory power control circuit 110 controlled by the controller 104 for controlling voltage (and thus power consumption) supplied to the memory 106. The memory power control circuit 110 may be incorporated as part of the controller 104 yet is shown separately for purposes of illustration. The I/O device 102 provides an interface to one or more external devices. In one embodiment in which the I/O control system 100 is incorporated within a communication system, the I/O device 102 may be a PHY device or the like which implements a physical layer of a communication interface. A PHY device, for example, provides an electrical, mechanical, and procedural interface to one or more transmission mediums (e.g., wired and/or wireless transmission mediums). Alternatively, the I/O device 102 is a bus or switch matrix interface or the like for enabling communications with associated electronic components, such as storage devices or the like (e.g., hard disk drive of a media player).

Although the I/O control system 100 is useful in communication systems, it is applicable to any type of I/O system for transferring information between electronic devices. The term "data" as used herein is used in a general sense and applies to any type of information stored in the memory for any reason.

The controller 104, which is coupled to the I/O device 102 via the I/O interface 103, performs higher level I/O functions. In a communication embodiment, for example, the controller 104 may be a media (or medium) access Control (MAC) device or the like implementing a data communication protocol sub-layer as part of the data link layer. A MAC controller, for example, provides addressing and channel access control mechanisms that make it possible for several network devices to communicate within a network. In general, the controller 104 uses the memory 106 to control data transfer operations between the I/O device 102 and the CPU 108. The memory 106, which is coupled to the controller 104 via memory interface 105, is typically dedicated to the controller 104 and includes dynamic memory such as random access memory (RAM) or the like. The processor system 108, which is coupled to the controller 104 via corresponding processor interface 107, represents the processing functions or central processing unit (CPU) of the particular system application or configuration.

In various embodiments, the memory 106 is an embedded memory system or the like incorporated with the controller 104 and the memory power control circuit 110 on an integrated circuit (IC) or chip 112. A system and method for reducing power consumption of active memory as described herein is particularly advantageous for, but not limited to, an embedded memory system, and is also applicable to other configurations such as discrete memory or off-chip memory devices and the like. Although shown external to the IC 112, the I/O device 102 or the processor system 108, or both, may also be integrated on the IC 112 depending upon the particular configuration or implementation. Many different types of system platforms are contemplated, such as a cellular telephone platform, a Windows® CE embedded platform by Microsoft®, a personal computer (PC) platform, a wireless Ethernet client platform, various access point (AP) platforms (e.g., Soft AP, HostAP, switched Thin AP, a self-hosted AP, AP Router, wireless distribution AP, mesh AP node, etc.), network bridge platforms, etc. A system and method for reducing power consumption of active memory as described herein is particularly advantageous for, but not limited to, portable or handheld electronic devices incorporating an I/O subsystem, such as cellular telephones, global positioning systems (GPS), any type of music or audio/video (A/V) media players (e.g., MP3 player, portable media player, etc.), handheld communication devices, etc. The memory power control circuit 110, as controlled by the controller 104, reduces voltage of selected portions of the memory 106 to reduce leakage currents and thus to reduce power consumption. As previously noted, as feature sizes scale below 100 nm, increasing leakage currents make static power consumption a significant concern, especially for ICs intended for battery-operated portable or handheld electronic devices.

Figure 2:
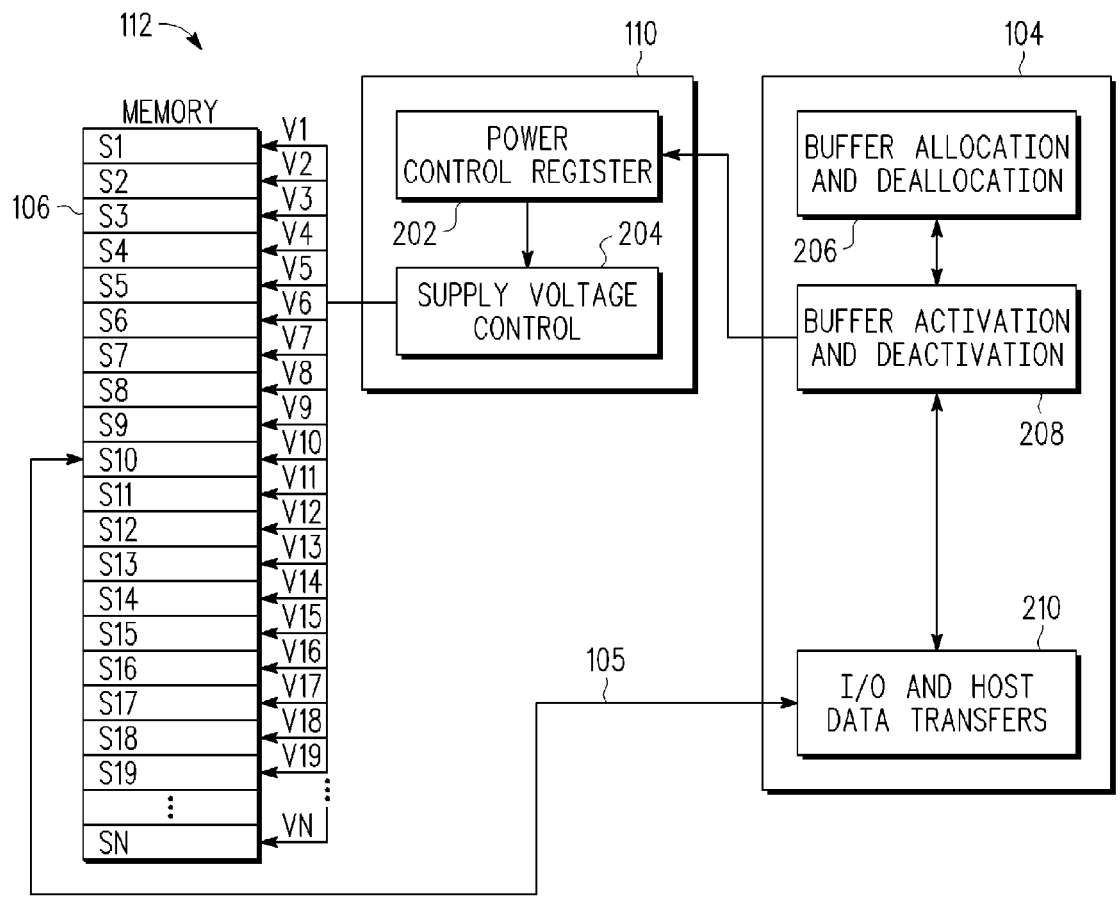
FIG. 2 is a more detailed block diagram of the IC of FIG. 1, including the interface between the controller, the memory and the memory power control circuit for implementing a memory control system for reducing power consumption of active memory according to one embodiment.

FIG. 2 is a more detailed block diagram of the IC 112 including the interface between the controller 104, the memory 106 and the memory power control circuit 110 for implementing a memory control system for reducing power consumption of active memory according to one embodiment. The memory 106 is shown configured as a memory array divided into a number "N" of equivalent-sized contiguous memory blocks S1, S2, . . . , SN. In one embodiment, the memory 106 is configured as a static random access memory (SRAM) although alternative memory configurations are known and contemplated. The size of the individual memory blocks S1-SN depends upon the particular configuration or application (e.g., 128, 256, 512, 1024, etc., bytes). The memory power control circuit 110 includes a power control register 202 and a supply voltage control block 204. Either or both of the power control register 202 and the supply voltage control block 204 may be incorporated as part of the controller 104 yet are shown separately for purposes of illustration. The power control register 202 stores power control bits for controlling the supply voltage control block 204. In one embodiment, the power control register 202 stores N power control bits, each bit for controlling the power supply voltage level provided to a corresponding one of the memory blocks S1-SN of the memory 106. The supply voltage control block 204 provides a separate one of a corresponding N voltage supply signals V1, V2, . . . , VN to each memory block S1-SN of the memory 106 as determined by the control bits of the power control register.

Each of the voltage supply signals V1-VN has an adjustable voltage level including a full power supply voltage level and a reduced power supply voltage level. The reduced power supply voltage level is a voltage level that enables the memory block to retain stored data at a reduced power consumption level with substantially lower static power dissipation. The reduced power supply voltage level is used to retain data within the memory block at the expense of substantially longer access time. The full power supply voltage level enables a memory block to operate with fast access time during read or write operations to that memory block although with increased power dissipation. In this manner, the supply voltage control block 204 outputs full or reduced voltage on each of the voltage supply signals V1-VN to provide a corresponding voltage level for each of the memory blocks S1-SN based on the corresponding control bits of the power control register 202. In one embodiment the supply voltage control block 204 includes switch circuitry or the like for selecting between the full or reduced voltages to be provided to each of the memory blocks S1-SN based on the corresponding control bits of the power control register 202. The full and reduced voltages may be developed on the chip 112 by other voltage regulator circuitry (not shown) or may be provided from an off-chip source (not shown). In an alternative embodiment the supply voltage control block 204 may further include power supply or voltage regulator circuitry for developing the full and reduced voltages.

The controller 104 includes buffer allocation and deallocation logic 206, buffer activation and deactivation logic 208, and memory access logic 210. Whereas the power control register 202 and the supply voltage control block 204 are typically implemented in hardware, the buffer allocation and deallocation logic 206, the buffer activation and deactivation logic 208, and the memory access logic 210 are each implemented in any suitable combination of hardware or software depending upon the particular system implementation. Although not shown, the controller 104 executes control functions which interface the buffer allocation and deallocation logic 206 for performing data transfer operations between the I/O device 102 and the processor system 108. The control functions may be implemented in any suitable manner, such as any combination of software, hardware, firmware, etc. The control functions operate according to an I/O protocol for defining buffers needed for pending data transfer operations, where the I/O protocol is designed according to the particular configuration and/or implementation as understood by those skilled in the art. For example, the I/O protocol is different between a cellular telephone platform and a wireless network platform. The buffer allocation and deallocation logic 206 determines and identifies the data buffers (e.g., types) needed to perform data transfer functions of the controller 104 and indicates which data buffers are subject to pending data transfer operations. The buffer activation and deactivation logic 208 uses the data buffer indication information from the buffer activation and deactivation logic 208 and determines the physical location of each data buffer within the memory 106. The buffer activation and deactivation logic 208 further controls which memory blocks operate at the full power level at any given time and controls the bits of the power control register 202 accordingly. The memory access logic 210 is coupled to the memory 106 via the memory interface 105 for reading and writing data during data transfer operations. In order to achieve optimal performance, the memory access logic 210 accesses only those data blocks operating at the full power level to avoid significant latency. In one embodiment, data buffer usage rules are defined which place a relatively small upper bound on the number of memory blocks in the memory 106 that might need to be accessed with low latency. Such data buffer usage rules are based on the premise that only a relatively few number of the memory blocks are in active use at any particular time.

In operation, in response to data transfer functions performed by the control functions of the controller 104, the buffer allocation and deallocation logic 206 defines a data buffer and/or buffer type and a data operation to be performed using the buffer, such as a read or a write operation. The controller 104 needs low-latency access to a relative few active memory blocks of the memory 106 at any given time. The buffer activation and deactivation logic 208 identifies the memory blocks of the memory 106 used to implement each data buffer and controls the power control register 202 to provide the full power supply voltage level to selected memory blocks in which data transfer operations are pending. The remaining memory blocks receive the reduced power supply voltage level to conserve power. As noted above, each memory block receiving the full power supply voltage level operates at full power whereas each memory block receiving the reduced power supply voltage level operates at a reduced power consumption level. The selected memory blocks which operate at full power depends upon the particular implementation. In a basic embodiment, each memory block included in a data buffer in which actions are pending operate at full power. In a more efficient embodiment, less than all of the memory blocks of any given active data buffer operate at full power. In one embodiment, only a single memory block per buffer is fully powered. In any of these embodiments, during any short interval, the set of memory blocks involved in data transfers is a relatively small subset of the total capacity of the memory 106. The memory access logic 210 performs the data transfer operations via the memory interface 105 as dictated by the buffer allocation and deallocation logic 206 under control of the control functions.

Figures 3, 4:
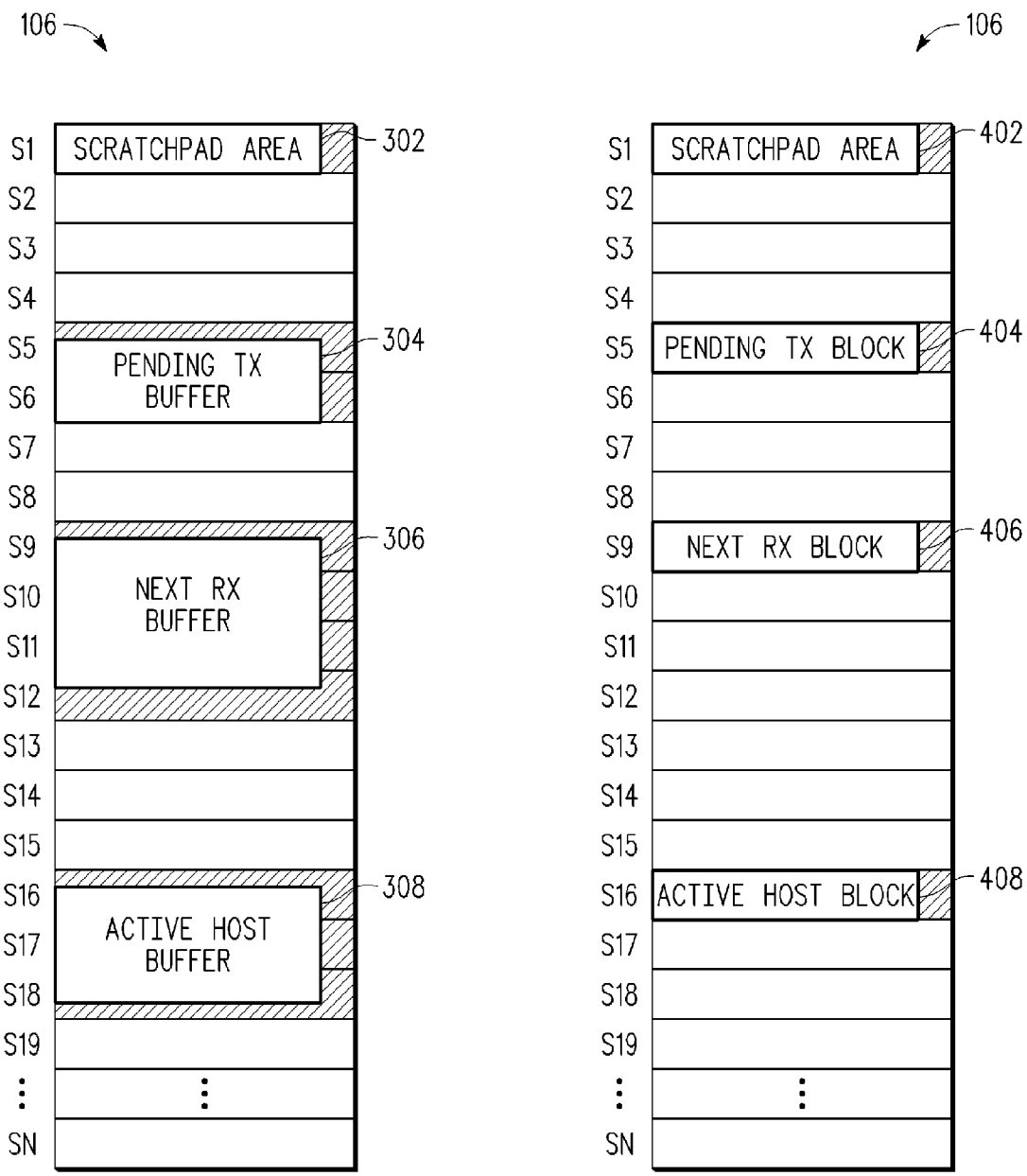
FIG. 3 is a functional block diagram illustrating a power saving memory configuration according to one embodiment.
FIG. 4 is a functional block diagram illustrating a power saving memory configuration according to a higher efficiency embodiment as compared to the basic embodiment.

FIG. 3 is a functional block diagram illustrating a power saving memory configuration according to one embodiment. In this basic embodiment, the memory 106 is shown incorporating a scratchpad area 302 and three data buffers, including a pending transmit (TX) buffer 304, a next receive (RX) buffer 306, and an active host buffer 308. In one embodiment, the scratchpad area 302 is provided for general administrative functions, such as, for example, maintaining state of the controller 104 and holding certain data structures as further described below, such as buffer descriptors, list headers, queue headers, etc. The pending TX buffer 304 is an output buffer awaiting or involved in the next outgoing I/O transfer to the I/O device 102. The next RX buffer 306 is an input buffer which is prepared for acceptance of the next incoming I/O transfer from the I/O device 102. The active host buffer 308 is provided for transfers to or from the processor system 108 (e.g., a host CPU or the like). The scratchpad area 302 is shown located within a first memory block S1, the pending TX buffer 304 is shown located within memory blocks S5-S6, the next RX buffer 306 is shown located within four memory blocks S9-S12, and the active host buffer 308 is shown located within three memory blocks S16-S18.

In the illustrated embodiment, the data buffers 304, 306 and 308 are variable-sized, contiguous arrays that begin at arbitrary addresses which are not necessarily aligned with power control block boundaries. As shown, the pending TX buffer 304 begins after the starting boundary of the memory block S5 and thus uses less than all of the memory block S5. Likewise, the next RX buffer 306 spans all of memory blocks S10 and S11 but uses only a portion of the memory blocks S9 and S12. Such data buffer configuration is typical of data memory usage by I/O control functions developed using conventional program development tools and embedded real-time operating system (RTOS) execution environments. In this configuration, the buffer activation and deactivation logic 208 ensures that each memory block used by at least a portion of each active buffer operates at the full power level to ensure operation at full speed with minimal latency. Thus, the buffer activation and deactivation logic 208 sets the bits of the power control register 202 to cause the supply voltage control block 204 to provide the full power supply voltage level to the memory blocks S5-S6, S9-S12 and S16-S18 to ensure minimal latency for the defined data buffers 304, 306 and 308. The buffer activation and deactivation logic 208 sets the bits of the power control register 202 to cause the supply voltage control block 204 to provide the reduced power supply voltage level to the remaining memory blocks S2-S4, S7-S8, S13-S15 and S19 to reduce power consumption.

In the illustrated embodiment, the scratchpad area 302 is wholly contained within the first memory block S1. An alternative embodiments, the scratchpad area 302 includes as many memory blocks as necessary for storing scratchpad information and may be located at any suitable or convenient location within the memory 106. In one embodiment, the memory blocks containing the scratchpad area 302 remain fully powered up so that scratchpad information remains available at minimal latency. In another embodiment, the memory block(s) containing the scratchpad area 302 are operated at the reduced power consumption level until the buffer allocation and deallocation logic 206 indicates a pending operation of scratchpad area information, in which case the buffer activation and deactivation logic 208 increases the power consumption level of the scratchpad area memory block(s) during actual memory access.

In one embodiment the power saving memory configuration illustrated in FIG. 3 is dynamic in that new buffers may be allocated and existing buffers deallocated over time. For example, the existing pending TX buffer 304 may be deallocated so that the memory blocks S5 and S6 are at least temporarily recaptured and placed back into reduced power mode (e.g., operate at the reduced power consumption level). Another TX data buffer (not shown) may be defined in another memory area (e.g., within the memory blocks S13 and S14), either at the same time as the pending TX buffer 304 or after the buffer 304 is deallocated. In either case the buffer activation and deactivation logic 208 sets the bits of the power control register 202 so that the memory blocks of the separate TX data buffer operate at the full power level while the separate TX data buffer remains allocated.

FIG. 4 is a functional block diagram illustrating a power saving memory configuration according to a higher efficiency embodiment as compared to the basic embodiment. In the high efficiency embodiment, the memory 106 is shown incorporating a scratchpad area 402 and three data buffers including a pending TX buffer 404, a next RX buffer 406, and an active host buffer 408 in a similar manner as the configuration of FIG. 3. As further described below for the high efficiency embodiment, the memory blocks store buffer blocks which are implemented as linked structures of fixed-size blocks that are aligned with power-control memory block boundaries. The buffer block size is equal to, sub-multiples of, or a multiple of, the memory block size. Although the buffer block size may be a multiple of the memory block size (such that each allocated buffer block includes multiple memory blocks), the memory blocks are usually the same size as or larger than the size of the data buffer blocks. A 1:1 configuration is shown and described herein in which the size of the buffer blocks are equal to the size of the memory blocks. It would be evident to one skilled in the art base on the teachings herein, however, that a power saving memory configuration as described herein is equally applicable to other than 1:1 configurations.

As described further below, the buffer blocks in the high efficiency embodiment are implemented as logical entities in a linked list of buffer blocks. In the illustrated case, the pending TX block 404, the next RX block 406 and the active host block 408 are buffer blocks which are wholly contained within the memory blocks S5, S9 and S16, respectively. In this manner, only the memory blocks S5, S9 and S16 operate at the full power level at the same time while pending data transfers are active within those memory blocks of the respective data buffers. At the illustrated point in time, the remaining memory blocks S2-S4, S6-S8, S10-S15 and S17-S19 operate at the reduced power consumption level thereby minimizing power consumption and maximizing power efficiency. The memory block S1 storing the scratchpad area 402 typically remains fully powered, although the scratchpad area power may be reduced at selected times in more sophisticated implementations.

In either the basic embodiment illustrated in FIG. 3 or the high efficiency embodiment illustrated in FIG. 4, the entire memory 106 is considered "active" since actual data transfer transactions are pending or otherwise taking place in at least a portion of the memory 106. In the basic embodiment, each memory block included by any given allocated buffer is fully powered to minimize latency for any data transfers occurring within the active data buffer. In the high efficiency embodiment, each memory block of a data buffer that is not currently involved in the pending transfer, even though part of an active buffer, is operated at the reduced power consumption level. In this manner, the high efficiency embodiment further reduces power consumption by reducing power of additional memory blocks within allocated and/or active data buffers. In the illustrated embodiment, the linked buffer block structure enables determination of memory blocks currently involved in current or pending data transfers so that the power consumption level of any remaining memory blocks within the data buffer may be reduced. Another significant benefit of the linked buffer block structure is more efficient use of memory because buffer blocks of the data buffers (and thus the memory blocks) do not have to be contiguous and thus do not allow allocation of buffers to include sufficient memory blocks to accommodate the actual amount of data. In the case of input buffers for devices that have variable and/or non-predictable incoming transfer sizes (for example, local area networks), this has the further benefit of avoiding the need to pre-allocate receive buffers of a size sufficient to hold the longest possible incoming transfer.

Figure 5:
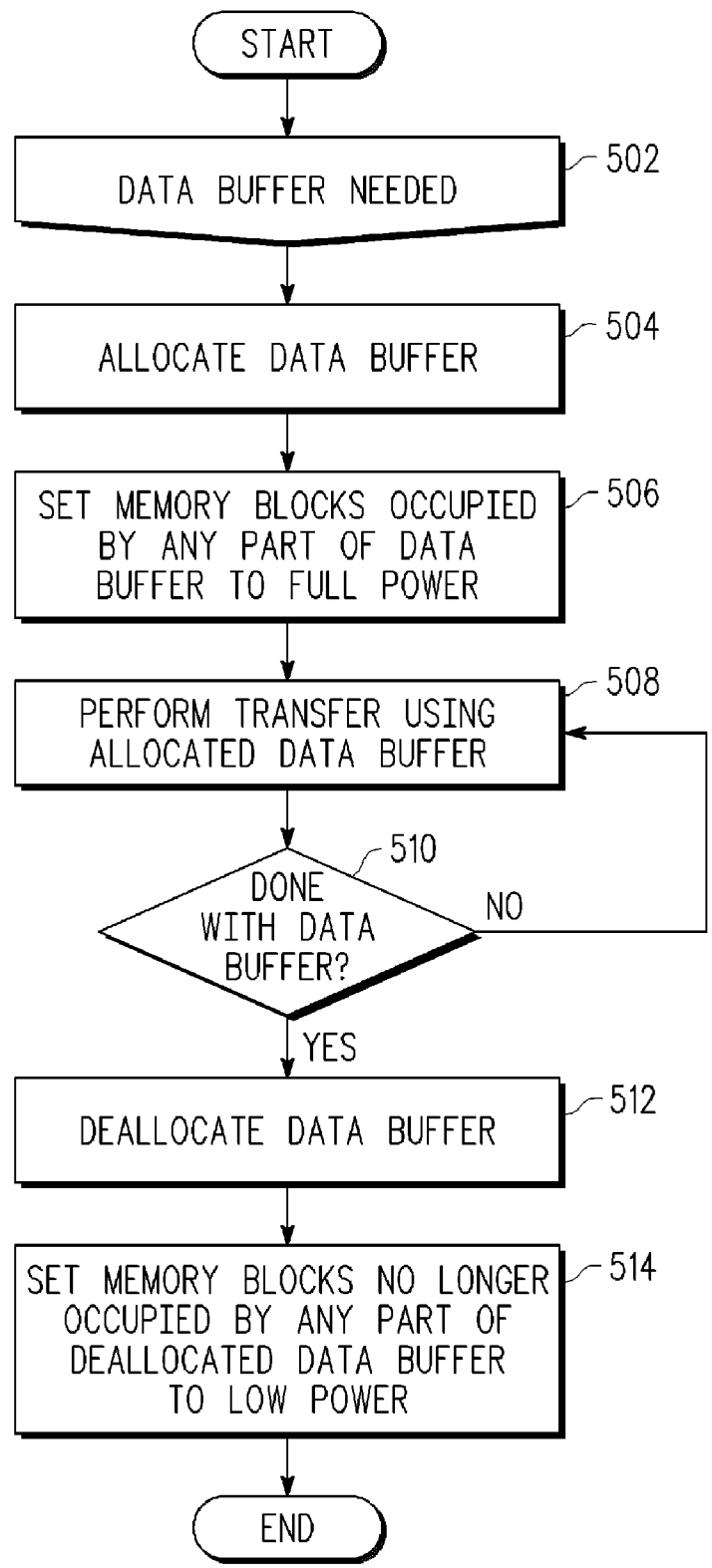
FIG. 5 is a flowchart diagram illustrating operation of the controller of FIG. 1 configured to operate according to the basic embodiment illustrated in FIG. 3 for each data buffer allocated in the memory.

FIG. 5 is a flowchart diagram illustrating operation of the controller 104 configured to operate according to the basic embodiment illustrated in FIG. 3 for each data buffer allocated in the memory 106. The illustrated procedure is repeated for each allocated data buffer and multiple data buffers may be simultaneously allocated and used at any time. Although not shown, an initialization procedure is performed prior to buffer allocations in which the buffer activation and deactivation logic 208 clears all of the bits of the power control register 202 so that all of the memory blocks S1-SN receive the reduced power supply voltage level to operate at the reduced power consumption level to minimize power consumption. At first block 502, the control functions determine that a new data buffer is needed for data transfer operations. At next block 504, the buffer allocation and deallocation logic 206 allocates a data buffer for performing the indicated data operation. At next block 506, the buffer activation and deactivation logic 208 controls the bits of the power control register 202 to set each memory block of the memory 106 occupied by any part of the newly allocated data buffer to full power. Note, for example, that memory block S12 of FIG. 3 is fully powered up even though the next RX buffer 306 uses less than half of the memory block S12. Operation proceeds to block 508 in which the memory access logic 210 performs the indicated data transfer according to the desired data operations of the control functions. At next block 510, it is queried whether operations are completed for the current data buffer. If not, operation loops between blocks 508 and 510 as long as the current data buffer is needed for data transfer operations and performs actions on behalf of other buffers as needed. When the control functions is done with the data buffer as determined at block 510, operation proceeds to block 512 in which the buffer allocation and deallocation logic 206 deallocates the data buffer. In response at block 514, the buffer activation and deactivation logic 208 controls the bits of the power control register 202 to reduce the power consumption level of each of the memory blocks of the deallocated data buffer within memory 106. Following this, the operation is completed for the current data buffer. Operations shown in FIG. 5 repeat for each data buffer to be allocated.

The basic embodiment illustrated in FIGS. 3 and 5 significantly improves efficiency by reducing power consumption of the active memory 106 since many of the memory blocks in the memory 106 operate at the low supply voltage level thereby reducing memory leakage currents. It is noted, however, that during operation of any given data buffer, typically only one memory block of that data buffer is actually involved in data transfer at any given time. Since all memory blocks of an allocated data buffer are fully powered during the life of the allocated data buffer while only one memory block is actually involved in a data transfer operation at any given time, efficiency may not be maximized. In the basic embodiment, the memory block that is actually being accessed at any given time is not specifically identified. Furthermore, in many configurations data buffers, especially input buffers, are pre-allocated to handle the maximum possible length of the pending transfer even if only a portion of the allocated data buffer is needed for a given data transfer. Consider, for example, a packet-switched communication configuration in which a maximum packet size is known. When receiving a packet from an external device, if the size of the packet is not known beforehand, then an RX input data buffer may be allocated for the maximum packet size within the memory 106. Since most packets in many packet-switched configurations are smaller than the maximum size, memory usage is not optimized since additional memory blocks are unnecessarily allocated and fully powered.

Figure 6:
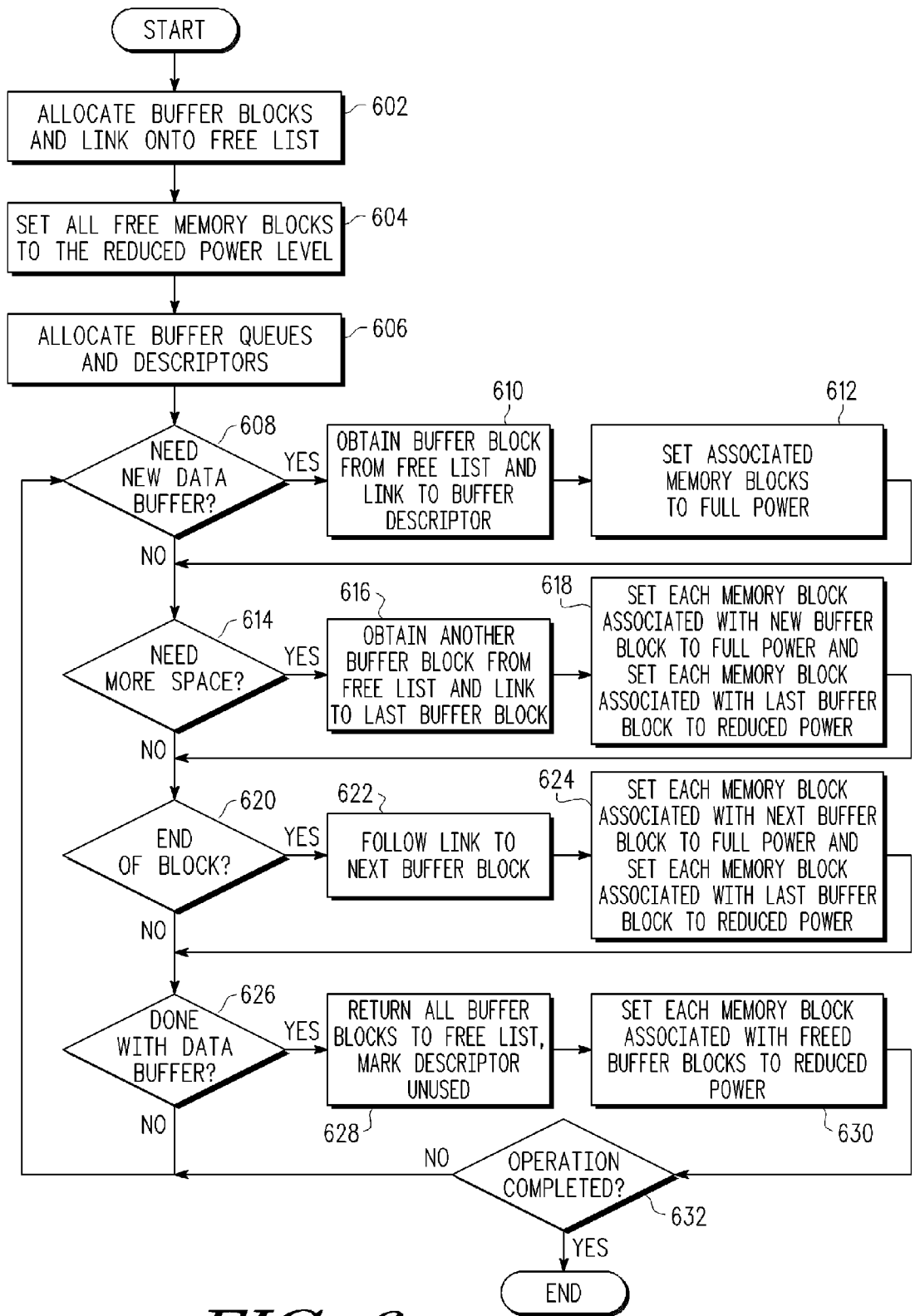
FIG. 6 is a flowchart diagram illustrating operation of the controller of FIG. 1 configured to operate according to the high efficiency embodiment illustrated in FIG. 4 for each data buffer to be allocated in the memory for the control functions.

FIG. 6 is a flowchart diagram illustrating operation of the controller 104 configured to operate according to the high efficiency embodiment illustrated in FIG. 4 for each data buffer to be allocated in the memory 106 for the control functions. An initialization procedure is initially performed at blocks 602, 604 and 606. At first block 602, the buffer allocation and deallocation logic 206 allocates buffer blocks and links the allocated buffer blocks into a free list of buffer blocks. During the buffer allocation process, the buffer activation and deactivation logic 210 assigns at least one of the memory blocks S1-SN to each of the allocated buffer blocks. In a 1:1 configuration (in which memory blocks are the same size as the buffer blocks), selected or available ones of the memory blocks S1-SN (which are not otherwise used for administrative purposes or which are not defined within a scratchpad area) are essentially configured as buffer blocks that are linked into a free list of buffer blocks. At next block 604, the buffer activation and deactivation logic 208 sets each of the memory blocks to the reduced power consumption level. In this manner, the memory 106 initially consumes a significantly reduced amount of power to optimize power efficiency. At next block 606, the buffer allocation and deallocation logic 206 allocates buffer queues and descriptors to implement a linked descriptor and buffer structure according to an exemplary embodiment. The linked descriptor and buffer structure described further below is only one example of many different buffer block allocations that may be used for the high efficiency embodiment.

Operation proceeds to block 608 which is the first block of a buffer allocation loop. As described herein, during the buffer allocation loop buffer blocks are dynamically linked into the data buffer as needed. At block 608 it is queried whether a new data buffer is needed. If so, operation proceeds to block 610 in which a buffer block is obtained from the free list and linked to a buffer descriptor for a new data buffer. At next block 612, each memory block associated with the newly allocated buffer block is set to the full power level by the buffer activation and deactivation logic 210 (e.g., by setting the corresponding bits of the power control register 202). A buffer block is "associated" with a memory block when the buffer block is incorporated within or otherwise includes at least part of a memory block. If the buffer block size is less than or equal to the memory block size, then only one memory block of this buffer is fully powered at 612. If a new data buffer is not needed as determined at block 608 or after each associated memory block is set to full power at block 612, operation proceeds to block 614 to determine whether more space is needed for a currently allocated data buffer. If so, operation proceeds to block 616 in which another buffer block is obtained from the free list and linked to the last buffer block of the data buffer being expanded. Operation then proceeds to block 618 in which each memory block associated with the newly linked buffer block is set to full power in a similar manner as previously described. Also at block 618, each memory block associated with the last buffer block is reset back to low power. In this manner, only those memory blocks associated with one buffer block of each data buffer receives full power to manage power consumption efficiently while providing a desired amount of low-latency buffer blocks.

After either blocks 614 or 618, operation proceeds to block 620 to determine whether the end of a buffer block has been reached during data transfer operation in that buffer block. If so, operation proceeds to block 622 in which a link is followed from the last block to access the next buffer block in the data buffer structure. At next block 624, each memory block of the next buffer block of the data buffer is set to full power and each memory block of the last buffer block is set to low power. After either blocks 620 or 624, operation proceeds to block 626 to determine whether the control functions is done with a data buffer. If so, operation proceeds to block 628 in which all of the buffer blocks of the completed data buffer are returned to the free list and the descriptor is marked as unused. At next block 630, each memory block associated with each of the freed buffer blocks is set to the reduced power consumption level. At next block 632, it is queried whether operation of the control functions are completed. If operation is stopped or is otherwise completed, operation terminates, and if not, operation returns to the first block 608 of the data buffer allocation loop. Also, if the control functions are not done with a data buffer as determined at block 626, operation returns to the first block 608 of the data buffer allocation loop.

During operation according to the high efficiency embodiment, multiple data buffers may be defined simultaneously and/or over time generally limited only by the overall storage capacity of the memory 106. In one embodiment, only those memory buffers that are associated with one buffer block per data buffer receives full power at any given time while the remaining memory blocks receive the reduced power consumption level. In one exemplary 1:1 configuration embodiment, only one memory block per data buffer receives the full power level at any given time. It is appreciated that various implementation details are possible and there is no absolute rule regarding simultaneous activation of memory buffers. In one memory system implementation of blocks 618 and 624, for example, each memory block of the new or next buffer block may receive full power before the power of each memory block of the last or previous buffer block is reduced during temporary transition periods. In other configurations, multiple memory blocks of any given buffer may receive full power simultaneously depending upon the particular implementation of the communication protocols.

Figure 7:
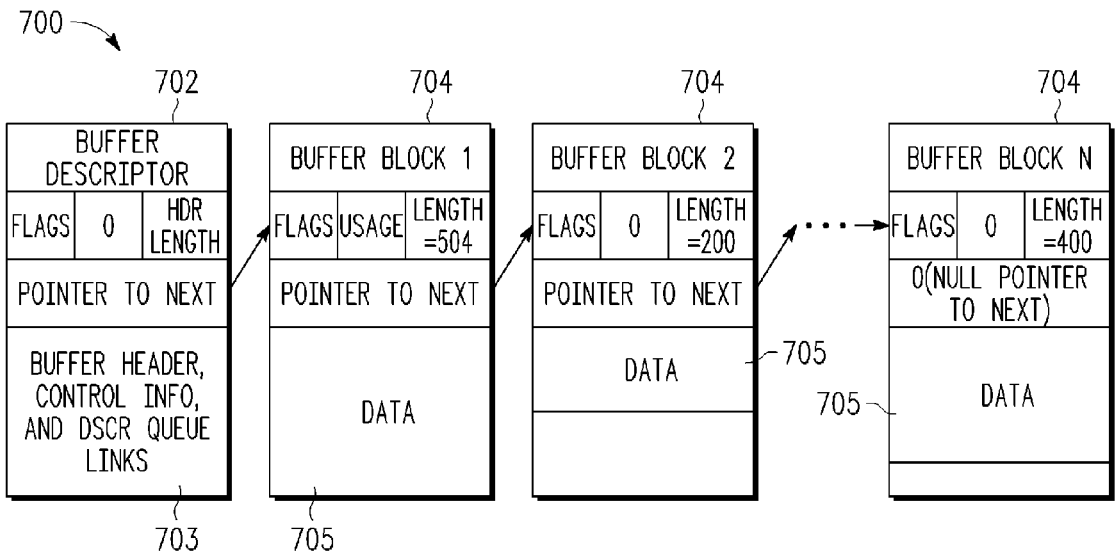
FIG. 7 is a figurative block diagram illustrating a linked buffer and descriptor structure which may be used by the controller of FIG. 1 configured to operate according to the high efficiency embodiment illustrated in FIGS. 4 and 6 for implementing each data buffer.

FIG. 7 is a figurative block diagram illustrating a linked buffer and descriptor structure 700 which may be used by the controller 104 configured to operate according to the high efficiency embodiment illustrated in FIGS. 4 and 6 for implementing each data buffer. The linked buffer and descriptor structure 700 includes a buffer descriptor 702 and one or more buffer blocks 704. In the illustrated embodiment, each buffer block 704 and the buffer descriptor 702 includes one or more status flags, a usage count, a data length, and a pointer to the next block in the linked buffer list. The pointer of the buffer descriptor 702 points to the first buffer block 704, shown as buffer block 1, which has its pointer pointing to the next buffer block 704, shown as buffer block 2, and so on up to the last buffer block 704, shown as buffer block N. The pointer of the last buffer block is a null or zero value or the like indicating the end of the buffer list. The linked buffer and descriptor structure 700 shows N buffer blocks 704 in which "N" is a positive integer. The buffer descriptor 702 further includes a memory area 703 for storing information about the data buffer, including a buffer header, control information, descriptor queue links, etc. Each of the buffer blocks 704 includes a data area 705 for storing data. In one embodiment the data area 705 of each of the buffer blocks 704 has a fixed size. The fixed-size data area does not have to be full which is useful to implement protocol features such as defragmentation and reassembly. As shown, for example, some buffer blocks 704 may be filled with data (as shown by buffer block 1) or partially full of data (as shown by buffer blocks 2 and N). For receive or input buffers, the buffer descriptor 702 may be pre-initialized and buffer blocks are added from a free list or the like as needed to hold incoming data. Buffer descriptors 702 may be organized into queues (e.g., by transfer order, service class, destination addresses, transfer schedule, flow control, etc.) using separate links as further described below.

Figure 8:
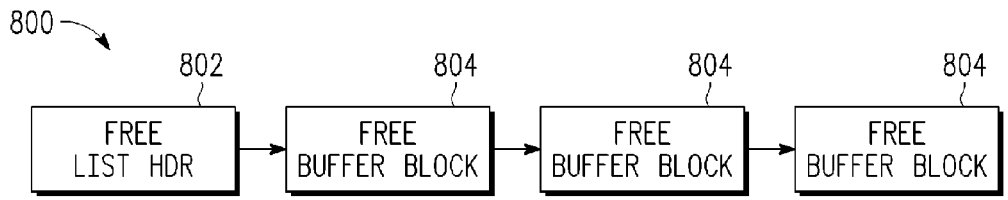
FIG. 8 is a figurative block diagram illustrating a free buffer block list according to one embodiment which may be used by the controller of FIG. 1 configured to operate according to the high efficiency embodiment illustrated in FIGS. 4 and 6.

FIG. 8 is a figurative block diagram illustrating a free buffer block list 800 according to one embodiment which may be used by the controller 104 configured to operate according to the high efficiency embodiment illustrated in FIGS. 4 and 6. The free buffer block list 800 includes a free list header 802 followed by any number (0 or more) of free buffer blocks 804. The free list header 802 and each of the free buffer blocks 804 includes a pointer to the next block (if any) in the chain of free memory buffer blocks in a similar manner as previously described in which the last block includes a null or zero pointer indicating the end of the free buffer block list 800. If for any reason there are no more free blocks available, then the pointer for the free list header 802 is null or zero. As understood by those of ordinary skill in the art, the free buffer blocks 804 are removed from the free buffer block list 800 and added to a data buffer or data queue or the like on an as-needed basis by the control logic. When the data buffer or a portion thereof is deallocated, the freed memory buffer blocks are returned to the free buffer block list 800. As an example, a free buffer block 804 is removed from the free buffer block list 800 and added as a buffer block 704 to the linked buffer and descriptor structure 700. When the buffer block 704 is no longer needed, it is unlinked from the linked buffer and descriptor structure 700 and added back as a free buffer block 804 to the free buffer block list 800.

Figure 9:
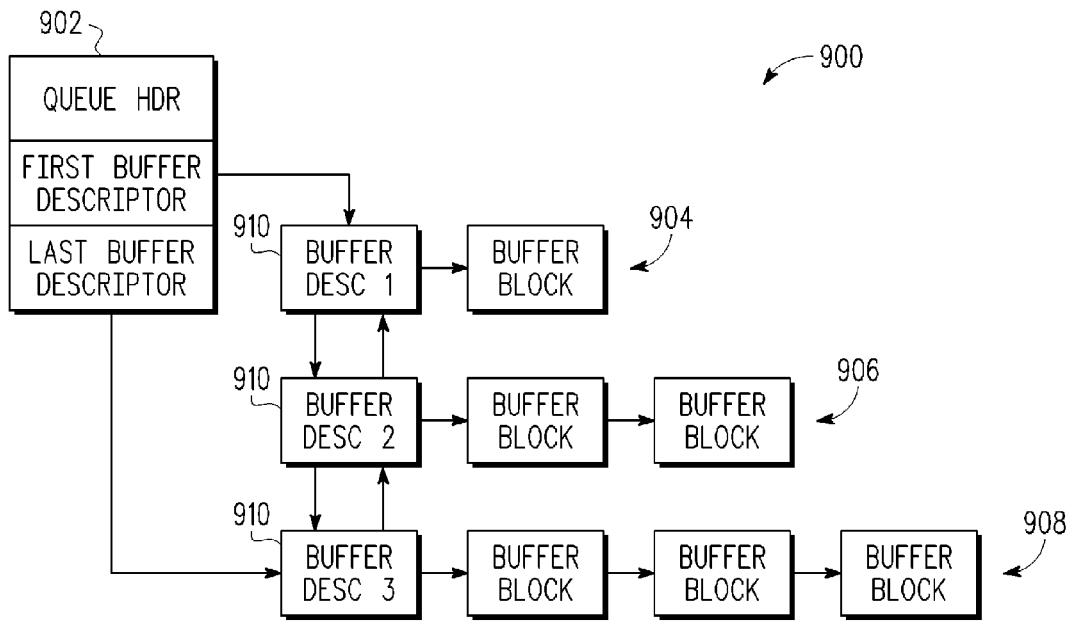
FIG. 9 is a block diagram illustrating a doubly-linked descriptor queue according to one embodiment which may be used by the controller of FIG. 1 configured to operate according to the high efficiency embodiment illustrated in FIGS. 4 and 6.

FIG. 9 is a block diagram illustrating a doubly-linked descriptor queue 900 according to one embodiment which may be used by the controller 104 configured to operate according to the high efficiency embodiment illustrated in FIGS. 4 and 6. The queue 900 includes a queue header 902 and any number of data buffers as needed in the queue. As shown, the queue 900 includes three data buffers 904, 906 and 908. Each data buffer 904, 906 and 908 is implemented in a similar manner as the linked buffer and descriptor structure 700 and includes a buffer descriptor 910 (similar to the buffer descriptor 702) and any number of buffer blocks as needed in the data buffer. The queue header 902 includes a first buffer descriptor pointer pointing to the buffer descriptor 910 of the first data buffer 904 and a last buffer descriptor pointer pointing to the buffer descriptor 910 of the last data buffer 908 of the queue 900. In the doubly-linked configuration, the buffer descriptor 910 of the first data buffer 904 points to the buffer descriptor 910 of the second data buffer 908, and the buffer descriptor 910 of the second data buffer 908 points to both buffer descriptors 910 of the first and last data buffers 904 and 908 of the queue 900. The buffer descriptor 910 of third (and last) data buffer 908 points back to the buffer descriptor 910 of the second data buffer 906. Although not shown, the buffer descriptors of any additional data buffers of the queue 900 are doubly-linked in a similar manner.

The buffer descriptors (e.g., 702) and the headers (e.g., free list header 802 and queue header 902) are generally stored together in the memory 106 in an administrative area, such as the scratchpad area or the like. As previously described, the high efficiency embodiment enables the advantage of minimizing power consumption and maximizing power efficiency by reducing or otherwise minimizing the number of memory blocks fully powered at any given time. Another significant benefit of the linked memory block structure is more efficient use of memory because memory blocks of the data buffers do not have to be contiguous and thus do not have to be pre-allocated to handle the maximum-length transfer. Instead, the activation or deactivation of buffer memory blocks is performed while following inter-block links controlled by hardware or software. This is especially valuable for network protocols such as transmission control protocol/internet protocol (TCP/IP), where the packet size distribution is strongly multi-modal.

A memory system for an I/O controller according to one embodiment includes a memory, a supply voltage control circuit and control logic. The memory includes multiple memory blocks each having a corresponding source voltage input for performing data transfer operations when its source voltage input is at a full voltage level. Each memory block retains stored information with reduced power consumption when its source voltage input is at a reduced voltage level which is less than the full voltage level. The supply voltage control circuit has multiple outputs, each coupled to one of the source voltage inputs of the memory, and each providing either one of the full voltage level or the reduced voltage level. The control logic allocates buffers in the memory to perform transfer operations based on I/O protocol, and controls the supply voltage control circuit to provide the full voltage level to at least one memory block of at least one allocated buffer and to provide the reduced voltage level to remaining memory blocks.

In one embodiment, the control logic allocates a buffer which includes multiple memory blocks and controls the supply voltage control circuit to provide the full voltage level to each memory block of the allocated buffer. In this embodiment, memory blocks that are not allocated in a buffer receive the reduced power supply level thereby reducing power consumption. In an alternative embodiment, the control logic may allocate a buffer including at least two memory blocks and controls the supply voltage control circuit to provide the full voltage level to less than all of the memory blocks of the buffer. In this embodiment, additional power is saved since at least some of the memory blocks of the allocated buffer are also powered at a reduced level. In another embodiment, the control logic controls the supply voltage control circuit to provide the full voltage level to only one of the memory blocks of the buffer at a time to optimize power efficiency by further reducing power consumption of each allocated buffer.

In one embodiment, the control logic organizes the memory blocks into buffer blocks in which each buffer block is associated with at least one memory block. The control logic allocates a buffer and dynamically links a buffer block into the buffer as needed. The control logic causes the supply voltage control circuit to provide the full supply voltage to each memory block associated with each buffer block newly linked into the buffer. The control logic may further cause the supply voltage control circuit to provide the reduced supply voltage to each memory block associated with a last one of the buffer blocks in the buffer after linking a new buffer block. The control logic may further determine an end of a current buffer block in the buffer during usage and follow a link to a next buffer block of the buffer. In one embodiment, the control logic causes the supply voltage control circuit to provide the full supply voltage to each memory block associated with the next buffer block, and to cause the supply voltage control circuit to provide the reduced supply voltage to each memory block associated with the current buffer block.

An integrated input/output controller according to one embodiment includes an embedded memory, a memory power control circuit and a controller. The embedded memory includes multiple memory blocks each having a corresponding source voltage input. Each memory block operates at a full voltage level and retains stored information with reduced power consumption when its source voltage input is at a reduced voltage level which is less than the full voltage level. The memory power control circuit has multiple outputs, each output coupled to a corresponding source voltage input of the embedded memory, and each output providing either one of the full voltage level and the reduced voltage level. The controller allocates buffers in the embedded memory for transfer operations according to input/output protocol, and controls the memory power control circuit to provide the full voltage level to at least one memory block of at least one allocated buffer and to provide the reduced voltage level to remaining memory blocks.

The controller may include buffer control logic which allocates a buffer for a pending memory operation, which selects at least one memory block included in the allocated buffer, and which programs the memory power control circuit. The buffer control logic may control the memory power control circuit to provide the full voltage level to each memory block included in the allocated buffer. The buffer control logic may control the memory power control circuit to provide the full voltage level to less than all of the memory blocks included in the allocated buffer. The buffer control logic may employ a linked buffer structure to identify only one memory block of the allocated buffer included in a pending memory operation, where the buffer control logic controls the memory power control circuit to provide the full voltage level to the identified memory block and to provide the reduced voltage level to every other memory block of the allocated buffer.

A method of reducing power consumption of a memory of an input/output controller includes providing a memory with multiple memory blocks each having a corresponding source voltage input, allocating buffers based on input/output protocol, and providing a full voltage level to each memory block selected for a pending memory operation and providing a reduced voltage level to memory blocks not selected for a pending memory operation. Each memory block normally operates at the full voltage level yet retains stored information with reduced power consumption when its source voltage input is at the reduced voltage level.

The method may include allocating a buffer which includes at least one memory block and providing the full voltage level to each memory block included in the allocated buffer. The method may include allocating a buffer including at least two memory blocks and providing the full voltage level to less than all of the memory blocks included in the allocated buffer. The method may include organizing the memory blocks into buffer blocks in which each buffer block is associated with at least one memory block, allocating a buffer and dynamically linking a buffer block into the buffer as needed, and providing the full supply voltage to each memory block associated with each buffer block newly linked into the buffer. The method may include providing the reduced supply voltage to each memory block associated with a last buffer block in the buffer after linking a new buffer block. The method may include determining an end of a current buffer block in the buffer during usage, following a link to a next buffer block of the buffer, providing the full supply voltage to each memory block associated with the next buffer block, and providing the reduced supply voltage to each memory block associated with the current buffer block. The method may further include deallocating the buffer, and providing the reduced supply voltage to each memory block associated with each buffer block included in the deallocated buffer.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A memory system for an input/output controller, comprising:
    a memory comprising a plurality of memory blocks each having a corresponding one of a plurality of source voltage inputs, wherein each of said plurality of memory blocks performs transfer operations when its source voltage input is at a full voltage level and retains stored information with reduced power consumption when its source voltage input is at a reduced voltage level;
    a supply voltage control circuit having a plurality of outputs, each said output coupled to a corresponding one of said plurality of source voltage inputs of said memory, wherein each of said plurality of outputs provides either one of said full voltage level and said reduced voltage level; and
    control logic which allocates buffers in said memory to perform transfer operations based on input/output protocol, and which controls said supply voltage circuit to provide said full voltage level to at least two allocated memory blocks which includes at least one memory block of at least one allocated buffer and to provide said reduced voltage level to remaining memory blocks.

2. The memory system of claim 1, wherein said control logic allocates a buffer comprising at least two memory blocks, and wherein said control logic controls said supply voltage control circuit to provide said full voltage level to less than all of said at least two memory blocks of said allocated buffer.

3. The memory system of claim 2, wherein said control logic controls said supply voltage control circuit to provide said full voltage level to only one of said at least two memory blocks of said allocated buffer at a time.

4. The memory system of claim 1, wherein said control logic organizes said plurality of memory blocks into a plurality of buffer blocks in which each buffer block is associated with at least one of said plurality of memory blocks, wherein said control logic allocates a buffer and dynamically links a buffer block into said allocated buffer as needed, and wherein said control logic causes said supply voltage control circuit to provide said full supply voltage to each of said plurality of memory blocks associated with each one of said plurality of buffer blocks newly linked into said allocated buffer.

5. The memory system of claim 4, wherein said control logic causes said supply voltage control circuit to provide said reduced supply voltage to each of said plurality of memory blocks associated with a last one of said plurality of buffer blocks in said allocated buffer after linking a new buffer block.

6. The memory system of claim 4, wherein said control logic determines an end of a current buffer block in said allocated buffer during usage, follows a link to a next buffer block of said allocated buffer, causes said supply voltage control circuit to provide said full supply voltage to each of said plurality of memory blocks associated with said next buffer block, and causes said supply voltage control circuit to provide said reduced supply voltage to each of said plurality of memory blocks associated with said current buffer block.

7. The memory system of claim 4, wherein said input/output protocol indicates a new read or write transfer operation using said allocated buffer, wherein said control logic dynamically links a new buffer block into said allocated buffer to perform said new read or write transfer operation, and wherein said control logic causes said supply voltage control circuit to provide said full supply voltage to said new buffer block and to provide said reduced supply voltage to a last buffer block in said allocated buffer.

8. The memory system of claim 1, wherein said control logic allocates a buffer comprising multiple memory blocks, and wherein said control logic controls said supply voltage control block to provide said full voltage level to each of said multiple memory blocks of said allocated buffer and to provide said reduced voltage level to at least one memory block of said memory.

9. A integrated input/output controller, comprising:
    an embedded memory comprising a plurality of memory blocks each having a corresponding one of a plurality of source voltage inputs, wherein each of said plurality of memory blocks operates at a full voltage level and retains stored information with reduced power consumption when its source voltage input is at a reduced voltage level which is less than said full voltage level;

a memory power control circuit comprising a plurality of outputs, each said output coupled to a corresponding one of said plurality of source voltage inputs of said embedded memory, wherein each of said plurality of outputs provides either one of said full voltage level and said reduced voltage level; and a controller which allocates buffers in said embedded memory for transfer operations according to input/output protocol, and which controls said memory power control circuit to provide said full voltage level to at least two allocated memory blocks which includes at least one memory block of at least one allocated buffer and to provide said reduced voltage level to remaining memory blocks.

10. The integrated input/output controller of claim 9, wherein said memory power control circuit comprises:

a power control register storing a plurality of bits indicating which of said plurality of memory blocks receive said full voltage level and which of said plurality of memory blocks receive said reduced voltage level; and a supply voltage control circuit having an input coupled to said power control register and a plurality of outputs providing either one of said full voltage level and said reduced voltage level based on said plurality of bits of said register.

11. The integrated input/output controller of claim 9, wherein said controller comprises buffer control logic which allocates a buffer for a pending memory operation, which selects at least one of said plurality of memory blocks included in said allocated buffer, and which programs said memory power control circuit.

12. The integrated input/output controller of claim 11, wherein said buffer control logic controls said memory power control circuit to provide said full voltage level to each of said plurality of memory blocks included in said allocated buffer.

13. The integrated input/output controller of claim 11, wherein said buffer control logic controls said memory power control circuit to provide said full voltage level to less than all of said plurality of memory blocks included in said allocated buffer.

14. The integrated input/output controller of claim 13, wherein said buffer control logic employs a linked buffer structure to identify only one of said memory blocks of said allocated buffer included in a pending memory operation, wherein said buffer control logic controls said memory power control circuit to provide said full voltage level to said identified memory block and to provide said reduced voltage level to every other memory block of said allocated buffer.

15. A method of reducing power consumption of a memory of an input/output controller, comprising:

providing a memory with a plurality of memory blocks each having a corresponding one of a plurality of source voltage inputs, wherein each memory block operates at a full voltage level and retains stored information with reduced power consumption when its source voltage input is at a reduced voltage level which is less than the full voltage level;

allocating buffers based on input/output protocol; and providing voltage including providing the full voltage level to at least two allocated memory blocks which includes at least one memory block of at least one allocated buffer and providing the reduced voltage level to remaining memory blocks.

16. The method of claim 15, wherein said allocating comprises allocating a buffer which includes at least one of the plurality of memory blocks and wherein said providing power comprises providing the full voltage level to each memory block included in the allocated buffer.

17. The method of claim 15, wherein said selecting comprises allocating a buffer which includes at least two of the plurality of memory blocks and wherein said providing voltage comprises providing the full voltage level to less than all of the memory blocks included in the allocated buffer.

18. The method of claim 15, further comprising:

organizing the plurality of memory blocks into a plurality of buffer blocks in which each buffer block is associated with at least one memory block;

wherein said allocating comprises allocating a buffer and dynamically linking a buffer block into the allocated buffer as needed;

wherein said providing voltage comprises providing the full supply voltage to each memory block associated with each buffer block newly linked into the allocated buffer.

19. The method of claim 18, further comprising providing the reduced supply voltage to each memory block associated with a last buffer block in the allocated buffer after linking a new buffer block.

20. The method of claim 18, further comprising:

determining a new read or write transfer operation using the allocated buffer;

dynamically linking a new buffer block into the allocated buffer to perform the new read or write transfer operation;

providing the full supply voltage to each memory block associated with the new buffer block; and providing the reduced supply voltage to each memory block associated with a last buffer block in the allocated buffer.

21. The method of claim 18, further comprising:

determining an end of a current buffer block in the allocated buffer during usage;

following a link to a next buffer block of the allocated buffer;

providing the full supply voltage to each memory block associated with the next buffer block; and providing the reduced supply voltage to each memory block associated with the current buffer block.

22. The method of claim 18, further comprising:

deallocating the buffer; and providing the reduced supply voltage to each memory block associated with each buffer block included in the deallocated buffer.

* * * * *